UNITED STATES PATENT OFFICE.

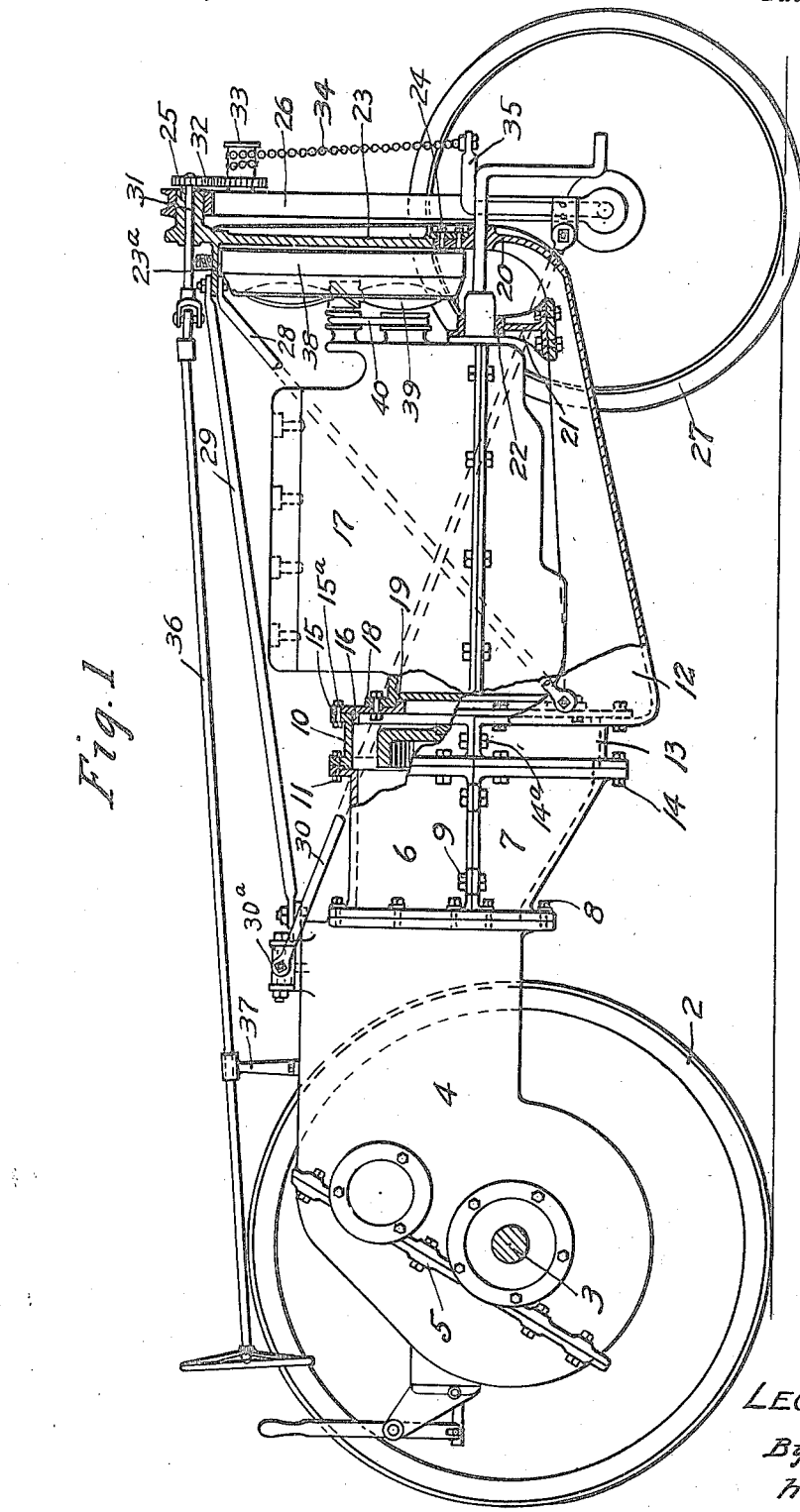

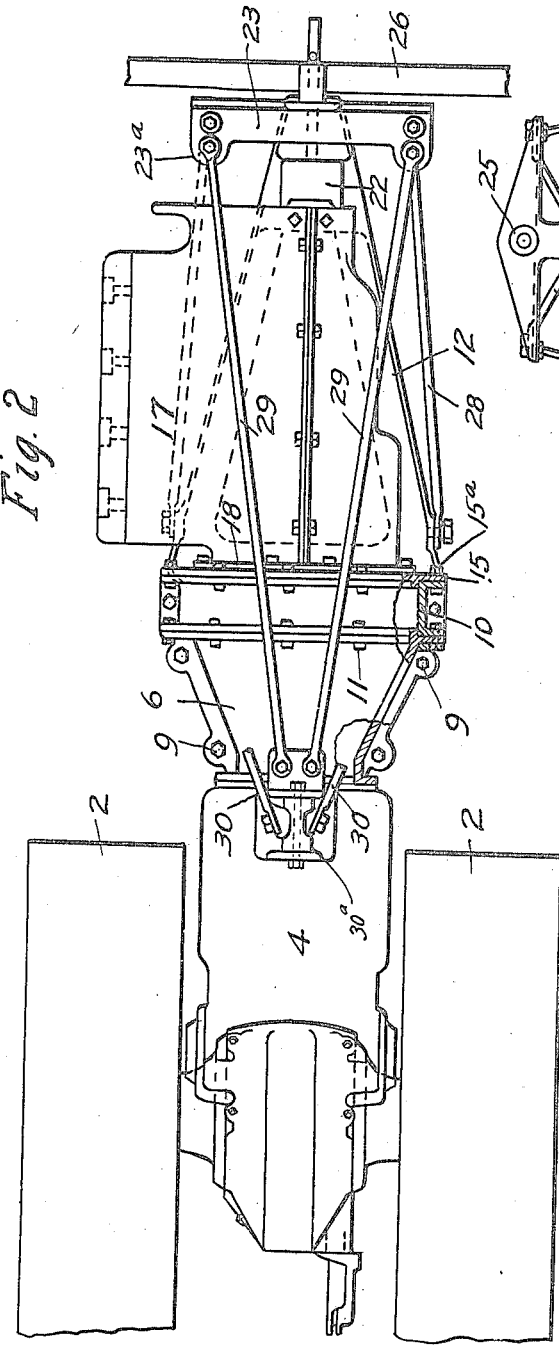
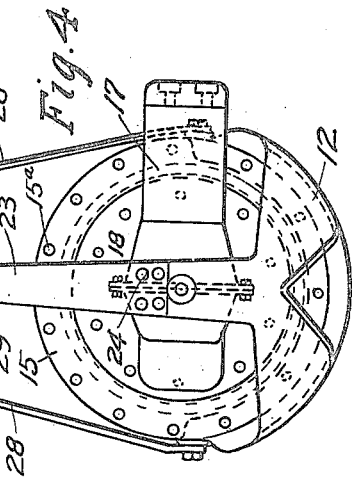
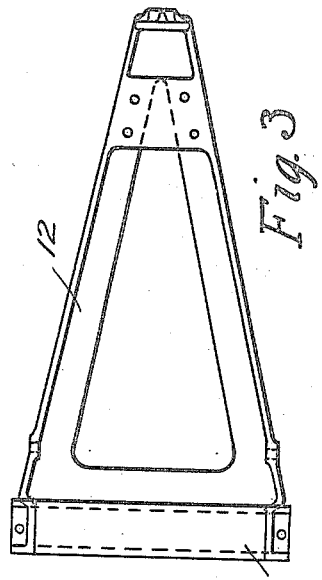

LEONARD NILSON, OF WAYZATA, MINNESOTA.

TRACTOR.

1,424,177.     Specification of Letters Patent.     Patented Aug. 1, 1922.

Application filed July 21, 1919. Serial No. 312,357.

*To all whom it may concern:*

Be it known that I, LEONARD NILSON, a citizen of the United States, resident of Wayzata, county of Hennepin, State of Minnesota, have invented certain new and useful Improvements in Tractors, of which the following is a specification.

My invention relates to the type of traction machine shown and described in the pending application of Harold Nilson and Leonard Nilson, filed October 29, 1918, Serial No. 260,202.

The object of my present invention is to provide a construction which will dispense with the upper section of the frame and still provide a rigid substantial support for the power plant.

A further object is to provide a construction in which the frame is composed of accurately machined sections which can be readily assembled and bolted together in building the machine.

A further object is to provide a construction of tractor which will allow convenient access to the engine and the interior of the clutch casing.

Other objects of the invention will appear from the following detailed description.

The invention consists generally in various constructions and combinations, all as hereinafter described and particularly pointed out in the claims.

In the accompanying drawings forming part of this specification,

Figure 1 is a side elevation, partially in section, of a traction machine embodying my invention, Figure 2 is a plan view of the same, Figure 3 is a plan view of a section of the frame, Figure 4 is a front view of a portion of the frame.

In the drawing, 2 represents the rear or traction wheels. 3 is an axle therefor and 4 is the housing for the transmission, access to which may be had upon the removal of the cover 5. The clutch housing which I arrange in advance of the housing 4 is composed of upper and lower rear sections 6 and 7 having flanged edges for securing them by bolts 8 to the housing 4. These housing sections have flanged meeting edges with bolts 9 between them. The clutch housing has also a forward section 10 secured by bolts 11 to the section 6 and a casting 12 has a rear portion 13 which forms the lower forward portion of the clutch housing and is secured to the sections 7 and 10 by bolts 14 and 14ª. A plate 15 is secured to the forward portions of the sections 10 and 13 by bolts 15ª and has an annular flange 16 fitting within the sections 10 and 13 and free to revolve thereon when the securing bolts are removed. The engine casing 17 has a flange 18 that is secured to the plate 15 and has a bearing at 19 thereon, said casing being free to rotate on the clutch housing when the bolts securing the plate 15 to the housing are removed. These bolts are positioned where they are readily accessible but if desired the bolts securing the flange 19 to the plate 15 may be loosened and the engine turned on its bearing in the plate 15. Generally, however, I prefer to remove the bolts 15ª as they are more conveniently located. The casting 12 has side rails converging toward the forward end and is provided with an upwardly turned portion 20. A bracket 21 is mounted on the forward portion of this section of the frame and has a bearing at 22 to support the forward end of the engine casing and allow the engine to be rotated on its longitudinal axis whenever it is desired to obtain access to some working part of the engine.

A T-shaped bracket 23 is bolted at 24 to the end portion 20 and projects upwardly therefrom and is provided at its upper end with a stud 25 that is journaled in the arched axle 26 of the forward steering wheels 27, the frame and the rear traction wheels being free to oscillate on this stud and allow the rear wheels to accommodate themselves to the uneven ground over which the machine may be moving, all as set forth in the pending application above referred to. This T-shaped bracket 23 has a web 23ª projecting rearwardly therefrom and brace rods 28 extend from this web to the rear portion of the casting 12 to brace and support the same, and similar brace rods 29 extend from the web 23ª to the upper forward portion of the housing 4, these rods serving to hold the parts in their proper relative position.

I also prefer to provide rods 30 pivoted at 30ª on the forward portion of the casting 4 and extending downwardly and forwardly to the end of the axle 26 for bracing and strengthening it with respect to other parts of the machine.

A spindle 31 is journaled in the stud 25 and is connected through the gearing 32 with a hub 33 which has flexible connections 34 with the knuckles 35 on the forward wheels for oscillating them to steer the machine. A steering post 36 is mounted in a bearing 37 on the transmission casing and connected with the spindle 31 for operating the steering mechanism. A radiator 38 is suspended from the web 23ª and a fan 39 is driven through a belt 40 from the engine 17.

In this construction the upper section of the frame extending backwardly from the forward axle is eliminated and the section supporting the engine is mounted for convenient separation from the remaining portion of the frame, the parts being properly machined so that assembling can be readily accomplished and a strong, substantial frame obtained with a minimum of parts and labor in assembling and fitting them together.

I claim as my invention:

1. A traction machine comprising rear traction wheels and an axle, a transmission housing mounted on said axle, a clutch housing secured to the forward portion of said transmission housing, a frame section secured to said clutch housing and projecting forwardly therefrom and having an upwardly extending forward end, forward wheels and an axle wherein said upwardly projecting forward end is horizontally pivoted, and a source of motive power carried by said frame section below its horizontal pivot on said axle and having a driving connection with said rear axle through said clutch housing.

2. A traction machine having a rear axle and traction wheels and a frame mounted thereon, said frame including a forward section detachably connected with the rear portion of the frame and having an upwardly projecting forward end provided with a horizontal pivot stud, a forward axle having carrying wheels and a bearing for said horizontal stud whereon said frame is free to oscillate and follow the movement of said traction wheels, and a source of motive power mounted on the forward portion of said frame and having a driving connection with said rear axle.

3. A traction machine comprising traction wheels, a rear axle therefor, a transmission housing mounted on said axle, a triangular casting connected with the forward portion of said housing, a forward axle and wheels therefor having a horizontal bearing for the forward end of said casting, a bracket mounted on said casting and an engine journaled in said bracket and having driving connections through said transmission housing with said rear axle.

4. A traction machine comprising rear traction wheels and axle, a transmission housing mounted thereon, a casting connected with said transmission housing and projecting forwardly, a forward axle having carrying wheels and a bearing for the forward end of said casting, an engine having a bearing on the forward portion of said casting, the rear portion of said engine being connected with said transmission housing for rotation of the engine thereon, and the rear portion of said casting allowing said engine to be rotated on its bearing to a substantially horizontal position.

5. A traction machine comprising a rear traction wheels and axle, a transmission housing mounted thereon, a frame connected with the forward portion of said housing, a source of motive power mounted in said frame, a forward axle and carrying wheels, the forward portion of said frame having a bearing on said axle above said source of motive power, brace rods connecting the upper forward portion of said frame with said transmission housing and with the lower rear portion of said frame.

6. A traction machine comprising rear traction wheels, an axle therefor, a transmission housing, a frame connected with said housing, a forward axle and carrying wheels, said frame having a bearing on said forward axle, a source of motive power mounted in said frame and connected with said transmission housing, brace rods connecting the upper forward portion of said transmission housing with the lower portions of said forward axle.

7. A traction machine comprising rear traction wheels and axle, a transmission housing mounted on said axle, a clutch housing secured to the forward portion of said transmission housing, a frame bolted to said clutch housing and projecting forwardly therefrom and having an upwardly turned forward end, a forward axle having carrying wheels, and a horizontal bearing for the upwardly turned forward end of said frame, and a motor supported by said frame and bolted to said clutch housing.

8. A traction machine comprising rear traction wheels and axle, a frame extending forwardly therefrom and having an upwardly projecting forward portion, a forward axle having a horizontal bearing for said upwardly projecting portion, a motor supported by said frame below said bearing and having a driving connection with said rear axle and said motor being mounted for oscillation laterally on a horizontal axis.

9. A traction machine comprising rear traction wheels, an axle, a transmission housing mounted thereon, a frame connected with the forward portion of said housing, a source of motive power mounted in said frame, a forward axle and carrying wheels, the forward portion of said frame having bearings on said axle above said source of motive power, brace rods connecting the upper forward portion of said frame on each side of its bearing on said forward axle with said transmission housing.

In witness whereof, I have hereunto set my hand this 14th day of July, 1919.

LEONARD NILSON.